United States Patent
Prakash et al.

(10) Patent No.: US 7,940,710 B2
(45) Date of Patent: May 10, 2011

(54) METHODS AND APPARATUS FOR EFFICIENT PAGING IN A WIRELESS COMMUNICATION SYSTEM

(75) Inventors: Rajat Prakash, San Diego, CA (US); Fatih Ulupinar, San Diego, CA (US); Nikhil Jain, San Diego, CA (US); Nileshkumar J. Parekh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 11/020,458

(22) Filed: Dec. 22, 2004

(65) Prior Publication Data

US 2006/0133269 A1 Jun. 22, 2006

(51) Int. Cl.
*G08C 17/00* (2006.01)
(52) U.S. Cl. ........................ 370/311; 455/458
(58) Field of Classification Search ................ 370/311, 370/345, 329, 332, 333; 455/458, 502, 522, 455/434, 241, 515, 426.1, 426, 525, 574, 455/343.1, 432.1, 437, 435.1, 442; 340/7.38, 340/7.35; 714/760
See application file for complete search history.

(56) References Cited

U.S. PATENT DOCUMENTS

| | | | |
|---|---|---|---|
| 5,301,225 A | | 4/1994 | Suzuki et al. .................. 379/59 |
| 5,826,173 A | * | 10/1998 | Dent .............................. 340/7.38 |
| 5,835,023 A | * | 11/1998 | Ito et al. ........................ 340/7.35 |
| 6,069,880 A | | 5/2000 | Owen et al. ................... 370/311 |
| 6,240,288 B1 | * | 5/2001 | Wan et al. .................. 455/426.1 |
| 6,356,538 | B1* | 3/2002 | Li ................................ 370/311 |
| 6,363,267 | B1* | 3/2002 | Lindskog et al. ............. 455/574 |
| 6,393,295 | B1* | 5/2002 | Butler et al. .................. 455/458 |
| 6,421,540 | B1* | 7/2002 | Gilhousen et al. ............ 455/458 |
| 6,477,382 | B1 | 11/2002 | Mansfield et al. ............ 455/458 |

(Continued)

FOREIGN PATENT DOCUMENTS

CL  3389-2005  8/2006

(Continued)

OTHER PUBLICATIONS

International Search Report—PCT/US05/047646, International Search Authority—European Patent Office, May 2, 2006.

(Continued)

*Primary Examiner* — Aung S Moe
*Assistant Examiner* — Awet Haile
(74) *Attorney, Agent, or Firm* — Sandip S. Minhas; Darren M. Simon (57) ABSTRACT

The disclosed embodiments provide for methods and systems for monitoring a paging channel. In one aspect, a method for monitoring a paging channel includes monitoring a paging channel for a page message at scheduled paging slots, determining that an error has occurred at a given paging slot, and monitoring the paging channel for a re-page message at least one scheduled re-paging slot, where the re-paging slots occur after the given paging slot but before the next scheduled paging slot. In another aspect, a method for monitoring a paging channel includes monitoring a first one of a plurality of paging channels for a page message at scheduled paging slots, determining that an error has occurred at a given paging slot, and monitoring at least a second one of the plurality of paging channels for the page message.

18 Claims, 5 Drawing Sheets

U.S. PATENT DOCUMENTS

| | | | |
|---|---|---|---|
| 6,625,467 B2 | 9/2003 | New et al. | |
| 6,795,425 B1 * | 9/2004 | Raith | 370/345 |
| 7,006,468 B1 * | 2/2006 | Chen et al. | 370/330 |
| 7,167,458 B2 | 1/2007 | Agashe et al. | |
| 7,209,728 B2 * | 4/2007 | Ogura | 455/343.1 |
| 7,257,760 B2 * | 8/2007 | Rick et al. | 714/760 |
| 7,463,599 B2 | 12/2008 | Lindoff et al. | |
| 7,711,377 B2 | 5/2010 | Laroia et al. | |
| 2002/0006805 A1 * | 1/2002 | New et al. | 455/525 |
| 2003/0214937 A1 * | 11/2003 | Lindoff et al. | 370/350 |
| 2003/0223388 A1 * | 12/2003 | Agashe et al. | 370/329 |
| 2004/0166882 A1 | 8/2004 | He | 455/460 |
| 2004/0229605 A1 * | 11/2004 | Hwang et al. | 455/426.1 |
| 2005/0277429 A1 * | 12/2005 | Laroia et al. | 455/458 |

FOREIGN PATENT DOCUMENTS

| | | |
|---|---|---|
| CL | 3388-2005 | 6/2007 |
| CL | 3386-2005 | 7/2007 |
| CN | 1142308 | 2/1997 |
| WO | WO 95/12931 | 5/1995 |

OTHER PUBLICATIONS

Written Opinion—PCT/US05/047646, International Search Authority—European Patent Office, May 2, 2006.

International Preliminary Report on Patentability—PCT/US05/047646, IPEA—European Patent Office, Mar. 22, 2007.

International Search Report and Written Opinion—PCT/US2005/047646, International Search Authority—European Patent Office—May 2, 2006.

* cited by examiner

METHODS AND APPARATUS FOR EFFICIENT PAGING IN A WIRELESS COMMUNICATION SYSTEM

BACKGROUND

I. Field

The present invention relates generally to communication, and more specifically to methods and apparatus for efficiently paging and monitoring a paging message in a wireless communication system.

II. Background

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

There is therefore a need in the art for methods and apparatus for efficiently paging and monitoring a paging message in a wireless communication system.

SUMMARY

The disclosed embodiments provide for methods and systems for monitoring a paging channel. In one aspect, a method for monitoring a paging channel includes monitoring a paging channel for a page message at scheduled paging slots, determining that an error has occurred at a given paging slot, and monitoring the paging channel for a re-page message at at least one scheduled re-paging slot, where the re-paging slots occur after the given paging slot but before the next scheduled paging slot. In another aspect, a method for monitoring a paging channel includes monitoring a first one of a plurality of paging channels for a page message at scheduled paging slots, determining that an error has occurred at a given paging slot, and monitoring at least a second one of the plurality of paging channels for the page message.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein is "exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

Figure 1:
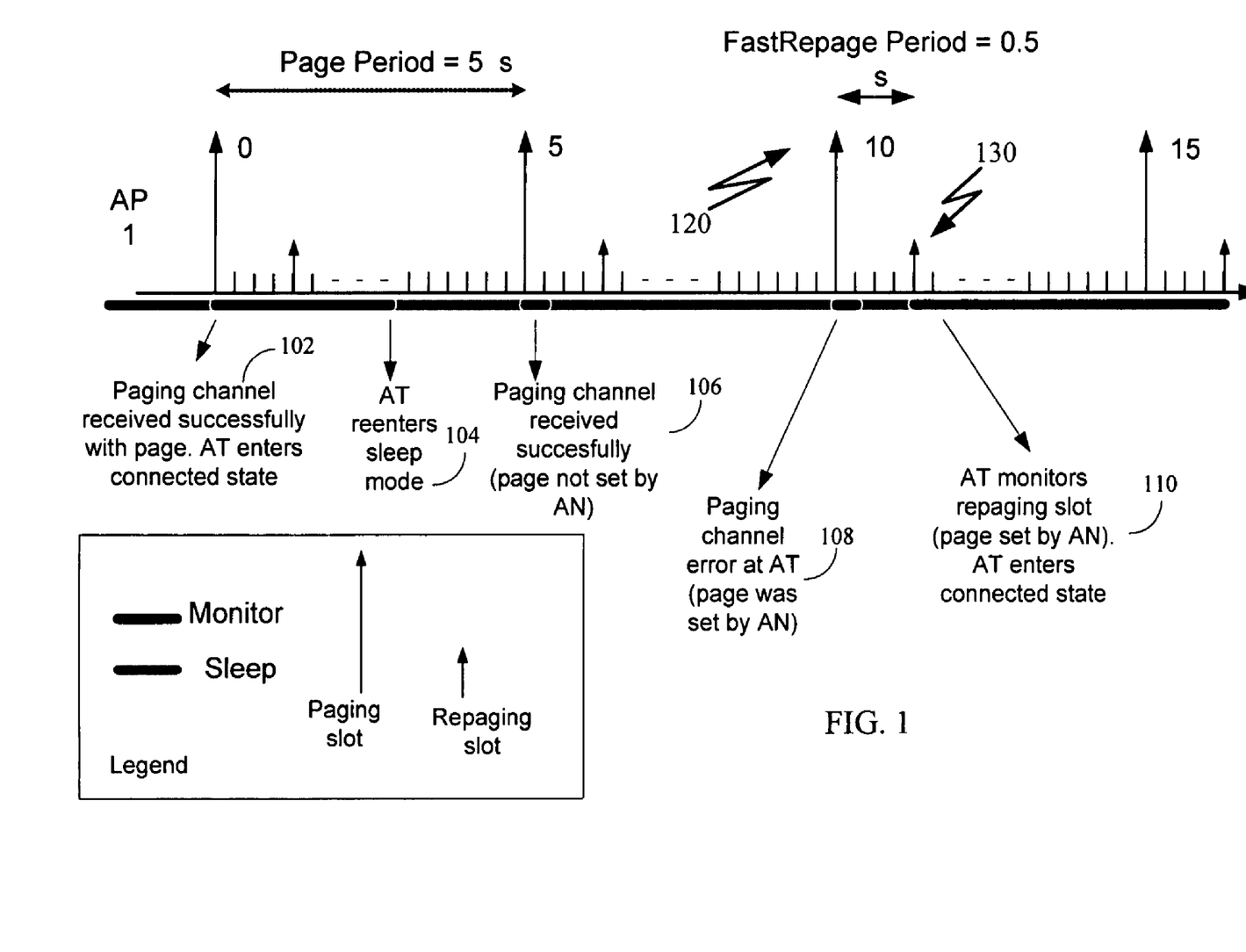
FIG. 1 shows a one embodiment for monitoring a paging channel in a communication network.

FIG. 1 shows one embodiment for monitoring a paging channel in a wireless communication network. In one embodiment, an idle access terminal (AT) operates in a slotted paging mode, i.e., the AT monitors a paging channel at regular intervals, and returns to sleep to conserve battery power. In case the AT successfully receives a paging channel and observes a page on the paging channel, as shown by 102, the AT makes an access attempt to connect to the system (i.e., transition from idle to connected state). After receiving data in a connected mode, the AT may re-enter sleep mode, as shown by 104. If, however, the AT successfully receives the paging channel but observes no page on the paging channel e.g. no page is set by an access network (AN), the AT may re-enter the sleep mode, as shown by 106.

Terminology

AP1: The access point from which the AT is currently monitoring pages.

AP2: The access point to which the AT may move to.

AAP: Anchor AP, the AP where the session of the AT is located, and where pages are generated. Pages are delivered to AP1 and AP2 over the network backbone, and AP1 and AP2 transmit the pages over the air in slots where the AT is known to monitor the paging channel.

AN: The system comprising all APs and backbone infrastructure.

Paging slot: Time instances when the AT wakes up to monitor the paging channel. These time instances may be known to the AT and AN.

Re-page: A page that is sent again when the AN does not receive a reply to a page it sent earlier.

Page error: An event at the AT by which the AT determines that it was unable to read the paging channel, e.g., a CRC error on the paging channel, or some other error.

Zone based paging: Each AP advertises its paging zone ID. Pages are sent from all APs in a paging zone that consists of certain APs. Paging zones are defined by the network, and may or may not be disjoint. The AT registers each time it enters a new paging zone (as identified by the zone ID).

Distance based registration: Each AP advertises its location in terms of latitude and longitude, and also its registration radius. If the AT wishes to receive pages from an AP (say AP1) that is more than the registration distance away from the AP where it registered last (say AP0), it may register at AP1. The AT is guaranteed by the AN that pages will be sent from all APs within registration distance of last registered AP.

In one embodiment a page set by the AN may not be observed by an AT due to an error. Page errors may be due to several reasons, including:

AT moves to a new AP: If the AT moves from AP1 to AP2 while the AT is in idle state, after the AT wakes up to monitor the paging channel, the AT may have inadequate strength on AP1, and may have not yet acquired the parameters of AP2, which allow the AT to read a page on AP2. In this case, after the AT wakes up and finds out that it has moved to AP2, the AT may have to search for the timing information of AP2 before the AT can identify AP2's paging slot. This may cause a delay during which some scheduled pages may be missed. This problem is more severe when AP1 and AP2 are not time synchronous, where due to timing skew between APs the AP2 may send the page earlier than AT expects it; causing even more page misses.

Fading: The AT may experience fading on the forward link from an AP during the paging slot.

Page errors may generally cause one or more of the following problems:

Latency. Missed pages result in latency for the AT. The AT may have to wait for the next paging slot, which may cause undesirable delay for applications with low latency requirements, such as push-to-talk type applications.

Network load: If the AT does not reply to a page, the AN may assume that the AT is out of the paging area, and may re-page in a larger area. Thus, the AN will page in an unnecessarily large area when a page error event occurs.

In one embodiment, in addition to paging slots that may occur periodically in time, as discussed above, the AT and AN define one or more fast re-paging slots, each occurring a time period after the scheduled paging slots. For example, as shown in FIG. 1, the scheduled paging slots 120 are 5 seconds apart, while the fast re-paging slots 130 may be each 0.5 seconds after each scheduled paging slot. In one embodiment, more than one re-paging slot may occur after the paging slot 120, but before the following scheduled paging slot.

Monitoring Procedures—Re-Page

If the AT experiences a page failure at a scheduled paging slot, as shown by 108, the AT may wake up at at least one following re-paging slot, as shown by 110, to monitor a re-page message. If the AT still fails to read a re-page message, the AT may monitor more re-paging slots, sequentially or otherwise, until it successfully monitors a re-page message. If the AT experiences a page failure at all of the re-paging slots, the AT wakes up to read the next scheduled paging slot. If, however, the AT monitors the paging channel successfully in a paging slot, the AT may not wake up for the re-paging slot.

Paging Procedures—Re-Page

Figure 2:
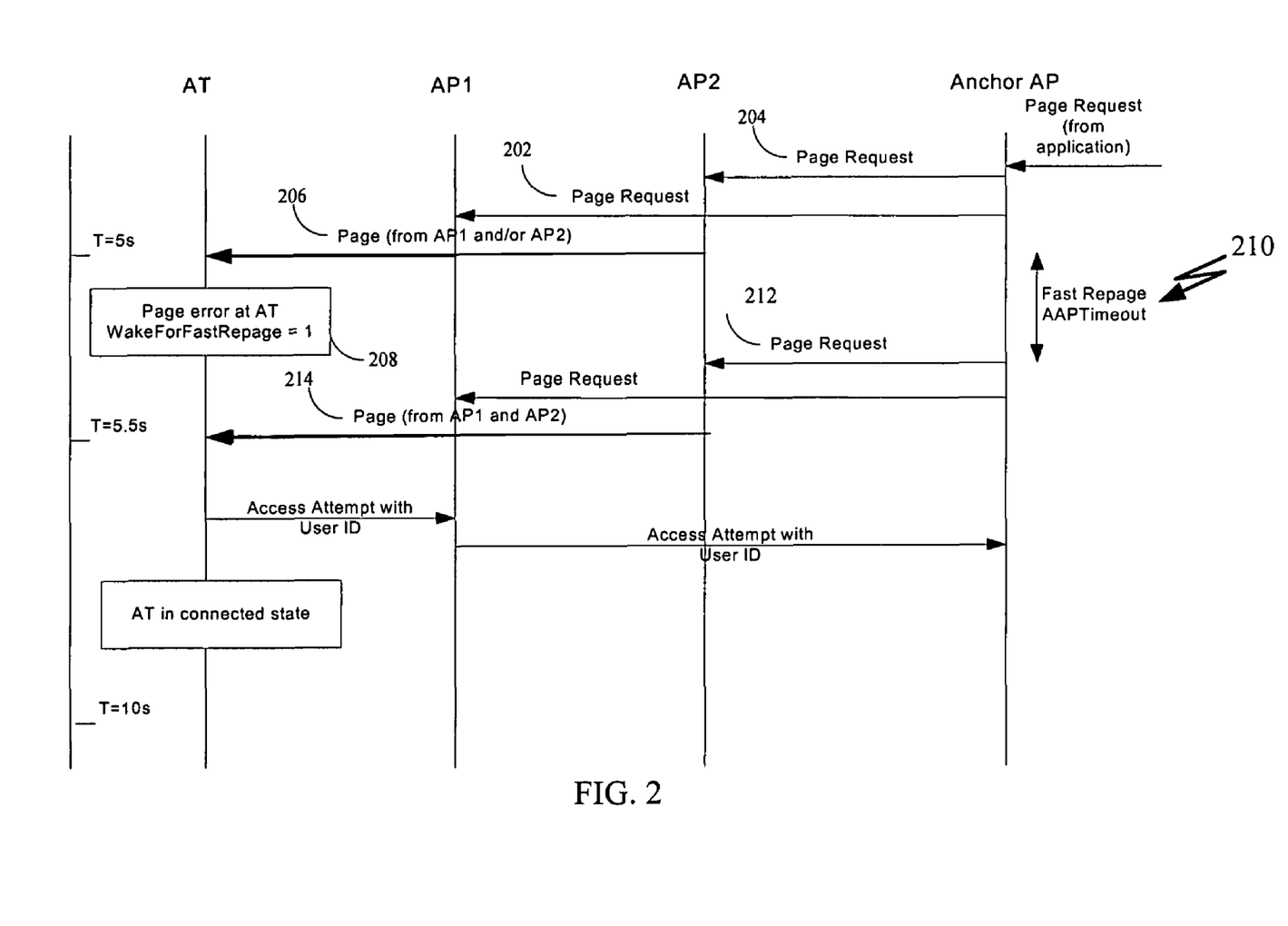
FIG. 2 shows a flow diagram for a paging process.

FIG. 2 shows a flow diagram for paging an access terminal. The AAP sends a page request to $AP_1$, shown by 202, and/or to $AP_2$, shown by 204, for transmission to a target AT, shown by 206. If the AAP does not receive a response from the AT to the page request it sent in a paging slot, e.g., due to a page error 208, for a predetermined time period, as shown by 210, the AAP sends a re-page request 212 to AP1 and/or to AP2. AP1 and/or AP2 may then re-page the AT in at least one following re-paging slot, as shown by 214. If the AAP receives a response to the page request within the time period 210, the AAP does not send a re-page request.

Monitoring Procedures—Active Set

In one embodiment, the AT monitors pages from more than one cell/sector, e.g. to reduce the chance of missing a page message. The AT may maintain such cell/sectors in an Active Set.

Figure 3:
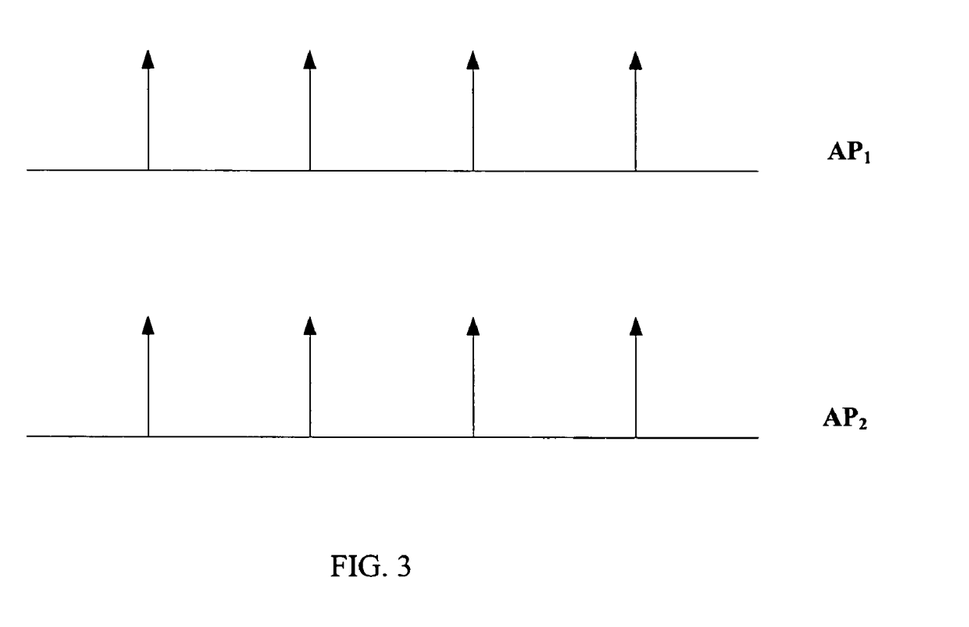
FIG. 3 shows one scenario for a multi-channel paging.

Synchronous Case: FIG. 3 shows one embodiment, where the paging slots on the APs in the active set occur at the same time; therefore, the AT's monitoring procedures are identical to the case when it is monitoring only one AP, as discussed above in connection to FIGS. 1 and 2. The AT wakes up at the scheduled paging slot and attempts to demodulate the paging channel, and if it fails to successfully monitor a page message, the AT attempts to demodulate the paging channel from at least one of the other APs in the active set. In one embodiment, AT considers a page to be successfully received if both following conditions are true:

The paging channel from at least one AP is demodulated successfully (e.g. with CRC match), and One of the paging channels that were decoded successfully contains a page for the AT.

Figure 4:
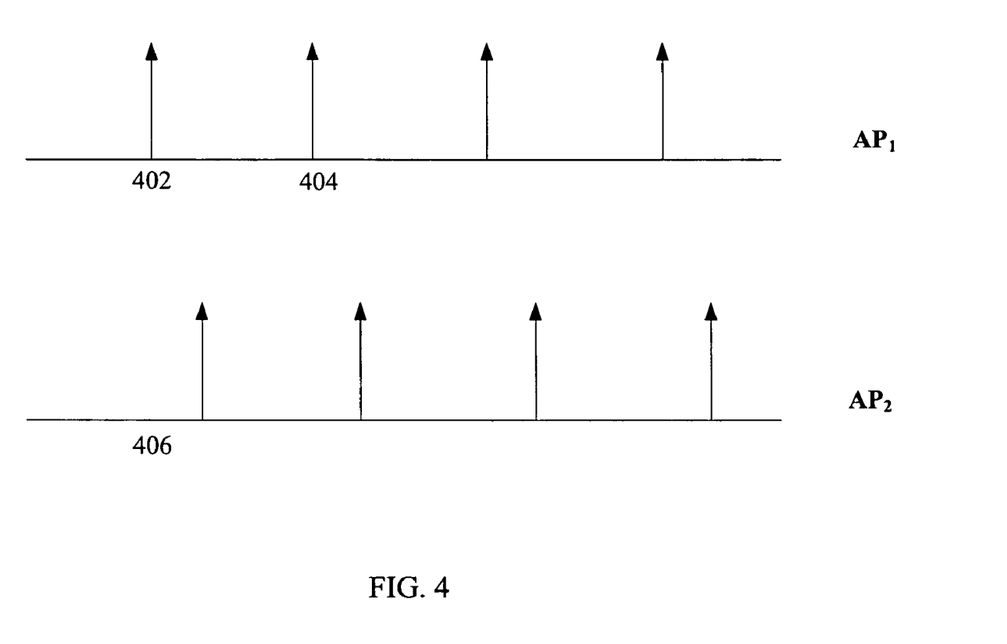
FIG. 4 shows another scenario for a multi-channel paging.

Asynchronous Case: FIG. 4 shows one embodiment, when the paging slots on some or all APs occur at different times. The AT first wakes up during the paging slot of the $AP_1$, as shown by 402 (with the earliest timing offset). If it decodes the paging channel successfully, it waits until the next scheduled paging slot 404, and may not read pages from other APs in the active set for the current paging slot. However, if the AT does not decode $AP_1$ successfully, the AT wakes up at the paging slot of $AP_2$, as shown by 406. The process may continue with monitoring more APs as needed; thus increasing the chance of efficiently decoding a paging channel. In one embodiment, monitoring a re-page message and monitoring more than one page channel may be combined.

One embodiment for maintaining the active set includes the AN sending pages for the target AT on some or all channels. Thus, if the system is using zone based paging, the AT may restrict the active set to APs in the paging zone it is currently in. If the system uses distance based paging, the AT may register in a way that all APs in the active set are within registration distance of the previous registration location.

Figure 5:
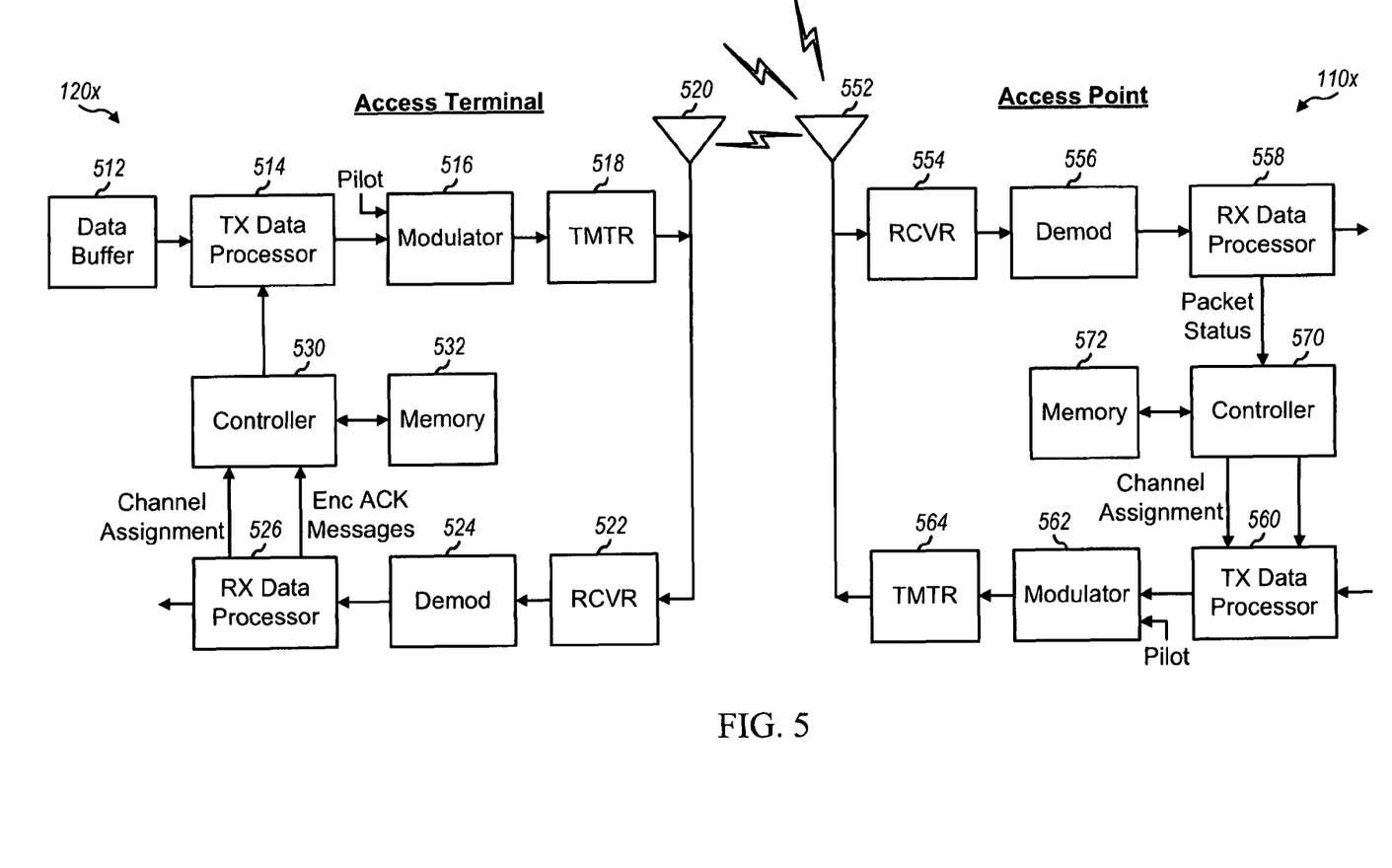
FIG. 5 shows a block diagram of an access point and an access terminal.

FIG. 5 shows a block diagram of an access point 110x and an access terminal 120x, for implementing the disclosed embodiments as discussed above in connection with FIG. 1 through FIG. 4. For the reverse link, at terminal 120x, a transmit (TX) data processor 514 receives traffic data from a data buffer 512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 516 receives the data symbols, pilot symbols, and possibly signaling for the reverse link, performs OFDM modulation and/or other processing as specified by the system, and provides a stream of output chips. A transmitter unit (TMTR) 518 processes (e.g., converts to analog, filters, amplifies, and frequency upconverts) the output chip stream and generates a modulated signal, which is transmitted from an antenna 520.

At access point 110x, the modulated signals transmitted by terminal 120x and other terminals in communication with access point 110x are received by an antenna 552. A receiver unit (RCVR) 554 processes (e.g., conditions and digitizes) the received signal from antenna 552 and provides received samples. A demodulator (Demod) 556 processes (e.g., demodulates and detects) the received samples and provides detected data symbols, which are noisy estimate of the data symbols transmitted by the terminals to access point 110x. A receive (RX) data processor 558 processes (e.g., symbol demaps, deinterleaves, and decodes) the detected data symbols for each terminal and provides decoded data for that terminal.

For the forward link, at access point 110x, traffic data is processed by a TX data processor 560 to generate data symbols. A modulator 562 receives the data symbols, pilot symbols, and signaling for the forward link, performs OFDM modulation and/or other pertinent processing, and provides an output chip stream, which is further conditioned by a transmitter unit 564 and transmitted from antenna 552. The forward link signaling may include power control commands generated by a controller 570 for all terminals transmitting on the reverse link to access point 110x. At terminal 120x, the modulated signal transmitted by access point 110x is received by antenna 520, conditioned and digitized by a receiver unit 522, and processed by a demodulator 524 to obtain detected data symbols. An RX data processor 526 processes the detected data symbols and provides decoded data for the terminal and the forward link signaling. Controller 530 receives the power control commands, and controls data transmission and transmit power on the reverse link to access point 110x. Controllers 530 and 570 direct the operation of terminal 120x and access point 110x, respectively. Memory units 532 and 572 store program codes and data used by controllers 530 and 570, respectively, to implement the disclosed embodiments.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 532 or 572 in FIG. 5) and executed by a processor (e.g., controller 530 or 570). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for monitoring a paging channel, the method comprising:
    monitoring, by an access terminal, a first paging channel for a page message at scheduled paging slots having a page period, wherein the first paging channel corresponds to a first access point in an active set of the access terminal;
    monitoring a second paging channel for a second page message at second scheduled paging slots having a second page period;
    determining that an error has occurred by identifying a failure to monitor both the page message at a given paging slot in the first paging channel and the second page message at a second given paging slot in the second paging channel; and
    monitoring one of the first paging channel and the second paging channel, based on determining the error has occurred and while in a first mode, for a re-page message at least one scheduled re-paging slot having a fast page period different from the page period and the second page period, the at least one re-paging slot occurring after the given paging slot and the given second paging slot but before the next scheduled paging slot and second paging slot according to the page period, wherein the second paging channel corresponds to at least one other access point in the active set.

2. The method of claim 1, wherein monitoring for the re-page message at the fast page period further comprises monitoring at a predetermined time after the page period.

3. The method of claim 1, wherein determining the error has occurred further comprises failing to demodulate the first paging channel and the second paging channel.

4. The method of claim 3, wherein failing to demodulate the first paging channel and second paging channel further comprises determining a CRC error on the first paging channel.

5. The method of claim 1, further comprising monitoring the second paging channel at the fast page period for the repage message.

6. The method of claim 1, wherein the second page period is different from the page period of the first paging channel, and further comprising:
    monitoring, based on determining the error has occurred, for the re-page message at least one scheduled second re-paging slot on the second channel having a second fast page period different from the fast page period of the first paging channel, the at least one second re-paging slot occurring after the given second paging slot but before the next scheduled second paging slot according to the page period.

7. The method of claim 1, further comprising restricting the active set to access points in a paging zone within which the access terminal is currently located.

8. The method of claim 1, further comprising including in the active set all access points within a registration distance of a previous registration location.

9. A non-transitory computer-readable medium for implementing a method for monitoring a paging channel, the non-transitory computer readable medium comprising:
    code for causing a computer to monitor, at an access terminal, a first paging channel for a page message at scheduled paging slots in the first paging channel, wherein the first paging channel corresponds to a first access point in an active set of the access terminal;

code for causing the computer to monitor, by the access terminal, a second paging channel for a second page message at second scheduled paging slots having a second page period;

code for causing the computer to determine that an error has occurred by identifying a failure to monitor both the page message at a given paging slot in the first paging channel and the second page message at a second given paging slot in the second paging channel; and code for causing the computer to monitor one of the first paging channel and the second paging channel, based on determining the error has occurred and while in a first mode, for a re-page message at least one scheduled re-paging slot having a fast page period different from the page period and the second page period, the at least one re-paging slot occurring after the given paging slot and the given second paging slot but before the next scheduled paging slot and second paging slot according to the page period, wherein the second paging channel corresponds to at least one other access point in the active set.

10. An apparatus for monitoring a paging channel, comprising:

an access terminal monitoring a first paging channel for a page message at scheduled paging slots having a page period, wherein the first paging channel corresponds to a first access point in an active set of the apparatus, monitoring a second paging channel for a second page message at second scheduled paging slots having a second page period, etermining that an error has occurred by identifying a failure to monitor both the page message at a given paging slot in the first paging channel and the second page message at a second given paging slot in the second paging channel, and monitoring one of the first paging channel and the second paging channel, based on determining the error has occurred and while in a first mode, for a re-page message at least one scheduled re-paging slot having a fast page period different from the page period and the second page period, the at least one re-paging slot occurring after the given paging slot and the given second paging slot but before the next scheduled paging slot and second paging slot according to the page period, wherein the second paging channel corresponds to at least one other access point in the active set.

11. The apparatus of claim 10, wherein the access terminal monitors at a predetermined time after the page period.

12. The apparatus of claim 10, wherein the determining the error has occurred comprises failing to demodulate the first paging channel and the second paging channel.

13. The apparatus of claim 12, wherein failing to demodulate the first paging channel and the second paging channel further comprises determining a CRC error on the first paging channel.

14. The apparatus of claim 10, wherein the access terminal further monitors the second paging channel at the fast page period for the repage message.

15. The apparatus of claim 10, wherein the second page period is different from the page period of the first paging channel, wherein the access terminal further monitors, based on determining the error has occurred, for the re-page message at least one scheduled second re-paging slot having a second fast page period different from the fast page period of the first paging channel, the at least one second re-paging slot occurring after the given second paging slot but before the next scheduled second paging slot according to the page period.

16. The apparatus of claim 10, wherein the access terminal restricts the active set to access points in a paging zone within which the access terminal is currently located.

17. The apparatus of claim 10, wherein the access terminal includes in the active set all access points within a registration distance of a previous registration location.

18. At least one processor configured to implement a method for monitoring a paging channel, the method comprising:

monitoring by an access terminal a first paging channel for a page message at scheduled paging slots having a page period, wherein the first paging channel corresponds to a first access point in an active set of the access terminal;

monitoring, by the access terminal, a second paging channel for a second page message at second scheduled paging slots having a second page period;

determining that an error has occurred by identifying a failure to monitor both the page message at a given paging slot in the first paging channel and the second page message at a second given paging slot in the second paging channel; and monitoring one of the first paging channel and the second paging channel, based on determining the error has occurred and while in a first mode, for a re-page message at least one scheduled re-paging slot having a fast page period different from the page period and the second page period, the at least one re-paging slot occurring after the given paging slot and the given second paging slot but before the next scheduled paging slot and second paging slot according to the page period, wherein the second paging channel corresponds to at least one other access point in the active set.

* * * * *